US012640801B2

(12) United States Patent
Dehghan et al.

(10) Patent No.: US 12,640,801 B2

(45) Date of Patent: May 26, 2026

(54) INTERACTION-AWARE MULTIPLE-USER JOINT SPATIAL-TEMPORAL BEAM MANAGEMENT

(71) Applicant: Dell Products L.P., Round Rock, TX (US)

(72) Inventors: Hoda Dehghan, Kanata (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 18/350,859

(22) Filed: Jul. 12, 2023

(65) Prior Publication Data

US 2025/0023621 A1    Jan. 16, 2025

(51) Int. Cl.
     *H04B 7/00*          (2006.01)
     *H04B 7/06*          (2006.01)

(52) U.S. Cl.
     CPC ................................. *H04B 7/0696* (2023.05)

(58) Field of Classification Search
     CPC ........................... H04B 7/06952; H04B 7/0696
     See application file for complete search history.

(56) References Cited

U.S. PATENT DOCUMENTS

| | | | | |
|---|---|---|---|---|
| 11,569,893 | B1* | 1/2023 | Kotagiri | H04B 7/0695 |
| 2019/0238209 | A1* | 8/2019 | Levitsky | H04L 5/0048 |
| 2020/0275402 | A1* | 8/2020 | Shi | H04W 16/28 |
| 2020/0379824 | A1* | 12/2020 | Chongfuangprinya | |
| | | | | G06F 17/18 |

| | | | | |
|---|---|---|---|---|
| 2021/0234591 | A1* | 7/2021 | Eleftheriadis | H04W 52/0206 |
| 2022/0070843 | A1* | 3/2022 | Levitsky | H04B 7/06952 |
| 2022/0190883 | A1* | 6/2022 | Kaya | H04B 7/06952 |
| 2022/0210781 | A1* | 6/2022 | Farag | H04L 5/0092 |
| 2022/0231746 | A1* | 7/2022 | Patel | H04B 7/06952 |
| 2022/0369122 | A1* | 11/2022 | Enescu | H04L 5/0051 |

(Continued)

FOREIGN PATENT DOCUMENTS

| | | | | |
|---|---|---|---|---|
| WO | WO-2024035322 A1 * | 2/2024 | | H04B 7/06952 |

OTHER PUBLICATIONS

"Adaptive Beam Management in 5G-NR: A Machine Learning Perspective"; Boqiang Wang; Mar. 24, 2021 (Year: 2021).*

(Continued)

*Primary Examiner* — Benjamin H Elliott, IV

(74) *Attorney, Agent, or Firm* — Amin, Turocy & Watson, LLP

(57)          ABSTRACT

The technology described herein is directed towards a joint spatial/temporal domain beam management including spatial domain beam management on the observation window and temporal beam management on the prediction window. Incorporating the spatial and temporal dependencies increases the prediction interval and makes the predictions more accurate because the spatial beam management is performed on the observation interval. Also described is interaction-aware multi-user equipment (UE) beam management technology that models multiple user interactions in the beam management procedure, to predict future trajectory data and to predict the best future beam and/or future best subset of beams per UE. A single user class or multiple classes of users (e.g., vehicle class users, pedestrian class users) can be considered for the predicted future trajectory data and or beam prediction data.

20 Claims, 10 Drawing Sheets

(56) References Cited

U.S. PATENT DOCUMENTS

| | | | | | |
|---|---|---|---|---|---|
| 2022/0385342 | A1* | 12/2022 | Shen | | H04W 52/0245 |
| 2023/0075088 | A1* | 3/2023 | Gao | | H04L 5/0048 |
| 2023/0086334 | A1* | 3/2023 | Chen | | H04B 7/0617 |
| | | | | | 375/267 |
| 2023/0232367 | A1* | 7/2023 | Abedini | | H04W 56/001 |
| | | | | | 370/329 |
| 2023/0239020 | A1* | 7/2023 | Ma | | H04L 5/0048 |
| | | | | | 375/262 |
| 2023/0246724 | A1* | 8/2023 | Pateromichelakis | | |
| | | | | | H04W 72/0453 |
| | | | | | 370/329 |
| 2023/0308199 | A1* | 9/2023 | Svennebring | | H04W 24/10 |
| 2023/0327736 | A1* | 10/2023 | Gao | | H04L 1/0026 |
| | | | | | 370/329 |
| 2023/0397029 | A1* | 12/2023 | Bai | | H04B 7/063 |
| 2024/0057058 | A1* | 2/2024 | Shen | | H04B 7/088 |
| 2024/0284200 | A1* | 8/2024 | Shao | | H04W 24/10 |
| 2024/0414565 | A1* | 12/2024 | Futaki | | H04L 43/0811 |
| 2025/0023621 | A1* | 1/2025 | Dehghan | | H04B 7/0696 |
| 2025/0030473 | A1* | 1/2025 | Li | | H04W 24/10 |
| 2025/0105929 | A1* | 3/2025 | Li | | H04B 17/3913 |
| 2025/0175242 | A1* | 5/2025 | Bao | | H04B 7/15542 |
| 2025/0184970 | A1* | 6/2025 | Li | | H04B 17/328 |
| 2025/0211312 | A1* | 6/2025 | Li | | H04L 5/0025 |

OTHER PUBLICATIONS

"Multi-Cell Multi-Beam Prediction Using Auto-Encoder LSTM for mmWave Systems"; Shah e al.; IEEE Transactions on Wireless Communications, vol. 21, No. 12, Dec. 2022 (Year: 2022).*

Invitation to Pay Additional Fees mailed Apr. 24, 2024 for PCT Application No. PCT/US2023/036210, 14 pages.

Huawei et al: "Evaluation on AI/ML for beam management" 3GPP Draft; RI-2302360, RAN WGI, No. e-meeting; Apr. 2023, [https://ftp.3gpp.org/tsg_ran/WG1_RL1/T SGR1_112b-e/Docs/RI-2302360.zip RI-2302360.docx] 45 pages.

ZTE Corporation: "Evaluation assumptions on AI/ML for beam management", 3GPP Draft; RI-2203250, RAN WGI, No. e-Meeting; Apr. 2022, [https://ftp.3gpp.org/tsg_ran/WG1_RL1/T SGR1_109-e/Docs/RI-2203250.zip RI-2203250 Evaluation assumptions on AIML for beam management.docx] 14 pages.

Liu Fan et al: "A Tutorial on Joint Radar and Communication Transmission for Vehicular Networks—Part III: Predictive Beamforming Without State Models", IEEE Communications Letters, vol. 25, No. 2, Feb. 2021, 5 pages.

International Search Report and Written Opinion mailed Sep. 20, 2024 for PCT Application No. PCT/US2023/036210, 22 pages.

3GPP TR 38.843, "Study on Artificial Intelligence (AI)/Machine Learning (ML) for NR air interface (Release 18)", May 23, 2022.

Kaya, et al., "Deep Learning-based predictive beam management for 5G mmwave systems," IEEE Wireless Communications and Networking Conference (WCNC), Mar. 29 to Apr. 1 in Nanjing, China, 2021, pp. 1-7.

Alahi, et al., "Social Istm: Human trajectory prediction in crowded spaces," in Proceedings of the IEEE conference on computer vision and pattern recognition, Jun. 26-Jul. 1, 2016, Las Vegas, NV, pp. 961-971.

O-RAN Alliance, "O-RAN.WG1.O-RAN-Architecture-Description-v07.00", Oct. 1, 2022.

Notification Concerning Transmittal of Copy of International Preliminary Report on Patentability mailed Jan. 22, 2026 for PCT Application No. PCT/US2023/036210, 13 pages.

European Office Action mailed Feb. 19, 2026 for European Patent Application No. 23813932.3, 3 pages.

* cited by examiner

100

104

Service Management and Orchestration (SMO) Framework

Non-Real Time RIC Layer     106                    110 rApps                                   O1 Services
           108        R1

A1

Near-Real Time RIC Layer     112     116 xApps              ML Inference
        114            Host

E2

E2 Node
118                CU-CP              CU-UP
     122                                      124

124              126     Real Time RIC Layer
DU / Pooled DUs

130     Beam                        dAPPs
     Management          128

EI: UE Location and Speed
              132
External              FHM
App Server

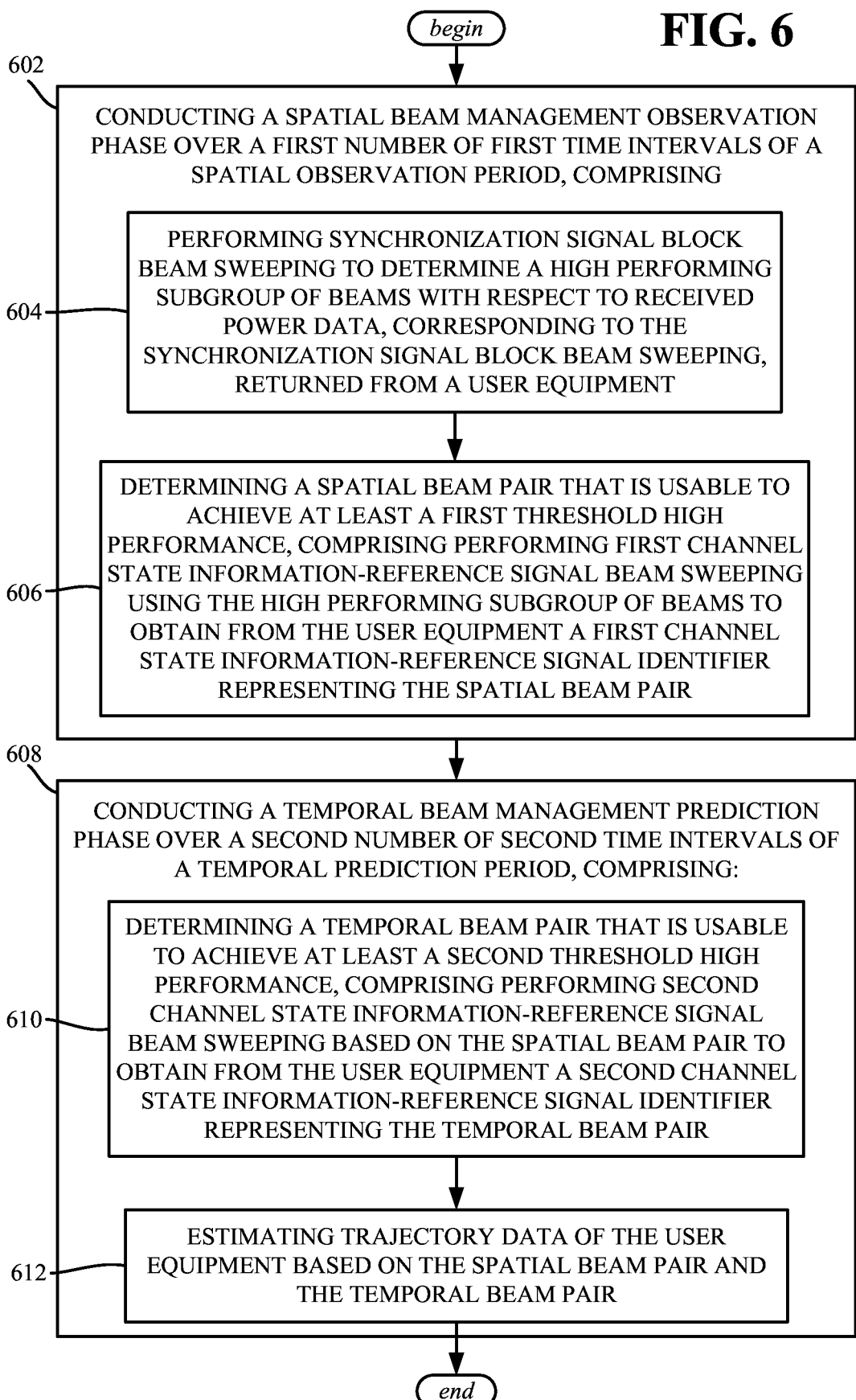

begin

602
CONDUCTING A SPATIAL BEAM MANAGEMENT OBSERVATION PHASE OVER A FIRST NUMBER OF FIRST TIME INTERVALS OF A SPATIAL OBSERVATION PERIOD, COMPRISING

604
PERFORMING SYNCHRONIZATION SIGNAL BLOCK BEAM SWEEPING TO DETERMINE A HIGH PERFORMING SUBGROUP OF BEAMS WITH RESPECT TO RECEIVED POWER DATA, CORRESPONDING TO THE SYNCHRONIZATION SIGNAL BLOCK BEAM SWEEPING, RETURNED FROM A USER EQUIPMENT

606
DETERMINING A SPATIAL BEAM PAIR THAT IS USABLE TO ACHIEVE AT LEAST A FIRST THRESHOLD HIGH PERFORMANCE, COMPRISING PERFORMING FIRST CHANNEL STATE INFORMATION-REFERENCE SIGNAL BEAM SWEEPING USING THE HIGH PERFORMING SUBGROUP OF BEAMS TO OBTAIN FROM THE USER EQUIPMENT A FIRST CHANNEL STATE INFORMATION-REFERENCE SIGNAL IDENTIFIER REPRESENTING THE SPATIAL BEAM PAIR

608
CONDUCTING A TEMPORAL BEAM MANAGEMENT PREDICTION PHASE OVER A SECOND NUMBER OF SECOND TIME INTERVALS OF A TEMPORAL PREDICTION PERIOD, COMPRISING:

610
DETERMINING A TEMPORAL BEAM PAIR THAT IS USABLE TO ACHIEVE AT LEAST A SECOND THRESHOLD HIGH PERFORMANCE, COMPRISING PERFORMING SECOND CHANNEL STATE INFORMATION-REFERENCE SIGNAL BEAM SWEEPING BASED ON THE SPATIAL BEAM PAIR TO OBTAIN FROM THE USER EQUIPMENT A SECOND CHANNEL STATE INFORMATION-REFERENCE SIGNAL IDENTIFIER REPRESENTING THE TEMPORAL BEAM PAIR

612
ESTIMATING TRAJECTORY DATA OF THE USER EQUIPMENT BASED ON THE SPATIAL BEAM PAIR AND THE TEMPORAL BEAM PAIR end

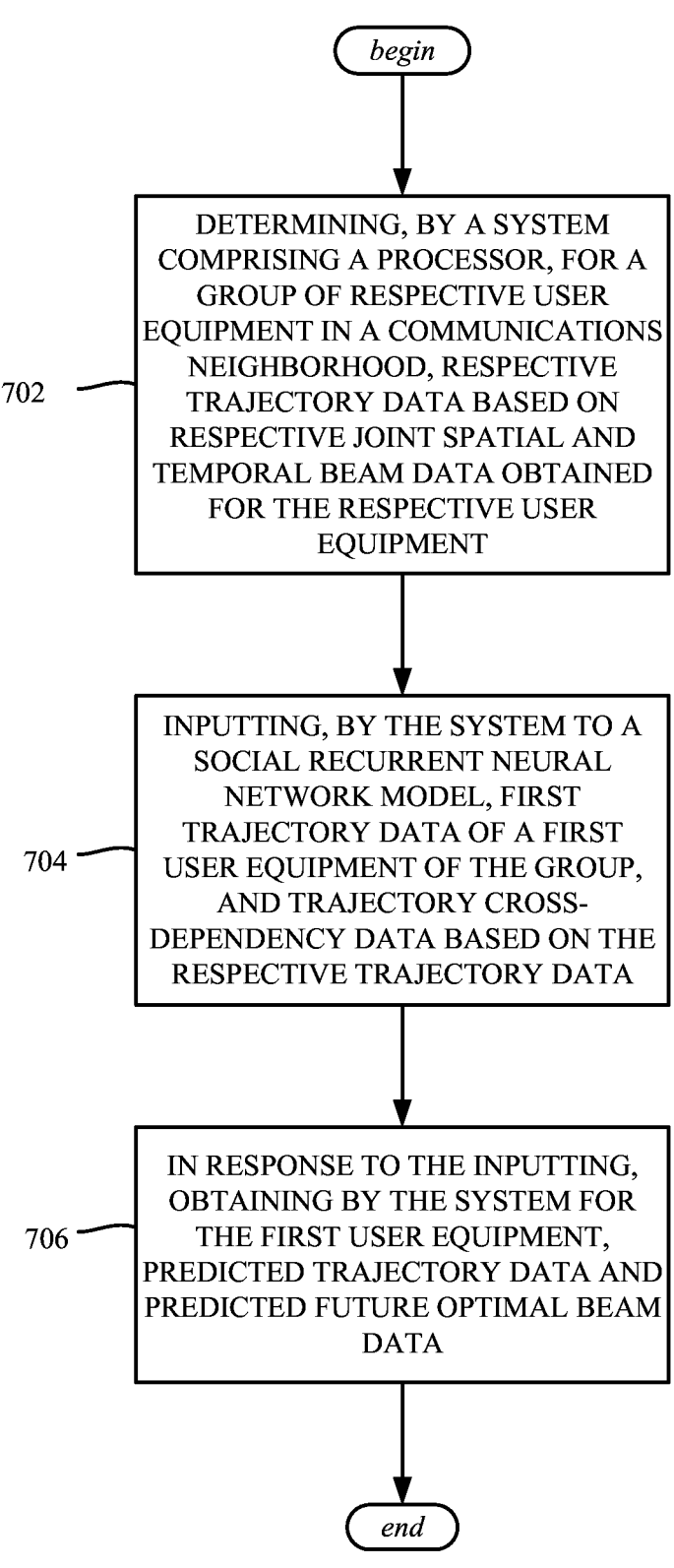

702 — DETERMINING, BY A SYSTEM COMPRISING A PROCESSOR, FOR A GROUP OF RESPECTIVE USER EQUIPMENT IN A COMMUNICATIONS NEIGHBORHOOD, RESPECTIVE TRAJECTORY DATA BASED ON RESPECTIVE JOINT SPATIAL AND TEMPORAL BEAM DATA OBTAINED FOR THE RESPECTIVE USER EQUIPMENT

704 — INPUTTING, BY THE SYSTEM TO A SOCIAL RECURRENT NEURAL NETWORK MODEL, FIRST TRAJECTORY DATA OF A FIRST USER EQUIPMENT OF THE GROUP, AND TRAJECTORY CROSS-DEPENDENCY DATA BASED ON THE RESPECTIVE TRAJECTORY DATA

706 — IN RESPONSE TO THE INPUTTING, OBTAINING BY THE SYSTEM FOR THE FIRST USER EQUIPMENT, PREDICTED TRAJECTORY DATA AND PREDICTED FUTURE OPTIMAL BEAM DATA

FIG. 7

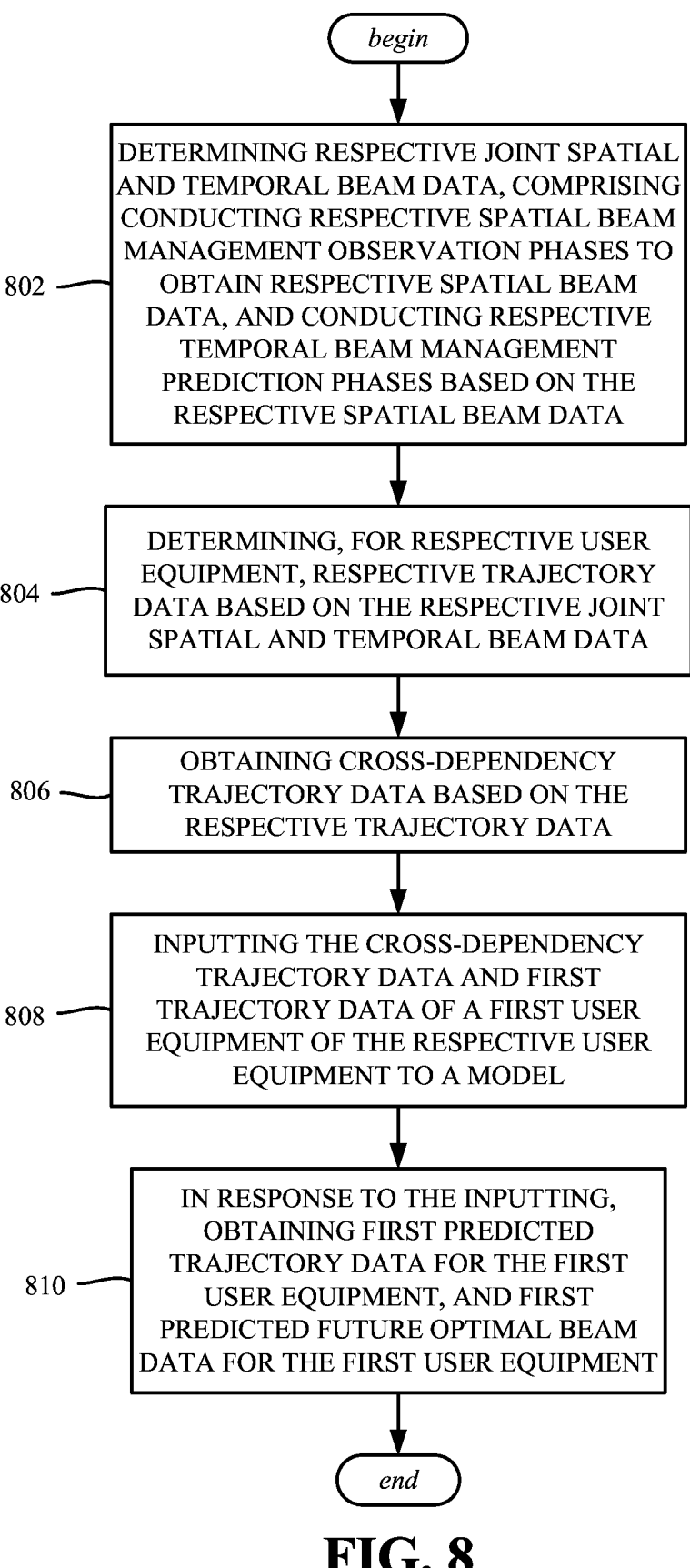

begin

802 — DETERMINING RESPECTIVE JOINT SPATIAL AND TEMPORAL BEAM DATA, COMPRISING CONDUCTING RESPECTIVE SPATIAL BEAM MANAGEMENT OBSERVATION PHASES TO OBTAIN RESPECTIVE SPATIAL BEAM DATA, AND CONDUCTING RESPECTIVE TEMPORAL BEAM MANAGEMENT PREDICTION PHASES BASED ON THE RESPECTIVE SPATIAL BEAM DATA

804 — DETERMINING, FOR RESPECTIVE USER EQUIPMENT, RESPECTIVE TRAJECTORY DATA BASED ON THE RESPECTIVE JOINT SPATIAL AND TEMPORAL BEAM DATA

806 — OBTAINING CROSS-DEPENDENCY TRAJECTORY DATA BASED ON THE RESPECTIVE TRAJECTORY DATA

808 — INPUTTING THE CROSS-DEPENDENCY TRAJECTORY DATA AND FIRST TRAJECTORY DATA OF A FIRST USER EQUIPMENT OF THE RESPECTIVE USER EQUIPMENT TO A MODEL

810 — IN RESPONSE TO THE INPUTTING, OBTAINING FIRST PREDICTED TRAJECTORY DATA FOR THE FIRST USER EQUIPMENT, AND FIRST PREDICTED FUTURE OPTIMAL BEAM DATA FOR THE FIRST USER EQUIPMENT end

FIG. 8

INTERACTION-AWARE MULTIPLE-USER JOINT SPATIAL-TEMPORAL BEAM MANAGEMENT

BACKGROUND

To facilitate accurate beam alignment between user equipment and a serving base station in a new radio (NR) network, the third generation partnership project (3GPP) standards provide reasonable flexibility with respect to configurations needed for beam measurement, beam report and beam indication. These configurations have some signaling overhead, resulting in a tradeoff between network performance and how much signaling overhead is implemented. For example, to guarantee continuous connection between user equipment and a base station, frequent beam measurement and measurement reporting are needed, particularly in high mobility scenarios. Such frequent beam measurement and measurement reporting results in increased signaling overhead, which tends to decrease the network's overall performance.

BRIEF DESCRIPTION OF THE DRAWINGS

The technology described herein is illustrated by way of example and not limited in the accompanying figures in which like reference numerals indicate similar elements and in which:

FIG. 6 is a flow diagram showing example operations related to conducting a spatial beam management observation phase and joint temporal beam management prediction phase, in accordance with various aspects and implementations of the subject disclosure.

FIG. 7 is a flow diagram showing example operations related to determining trajectory data via joint spatial-temporal beam management, for use with trajectory cross-dependency data, to predict a user equipment's future trajectory data and future optimal beam data, in accordance with various aspects and implementations of the subject disclosure.

FIG. 8 is a flow diagram showing example operations related to determining a user equipment's future trajectory data and future optimal beam data based on a joint spatial-temporal and cross-dependency data of other user equipment, in accordance with various aspects and implementations of the subject disclosure.

DETAILED DESCRIPTION

Figure 1:
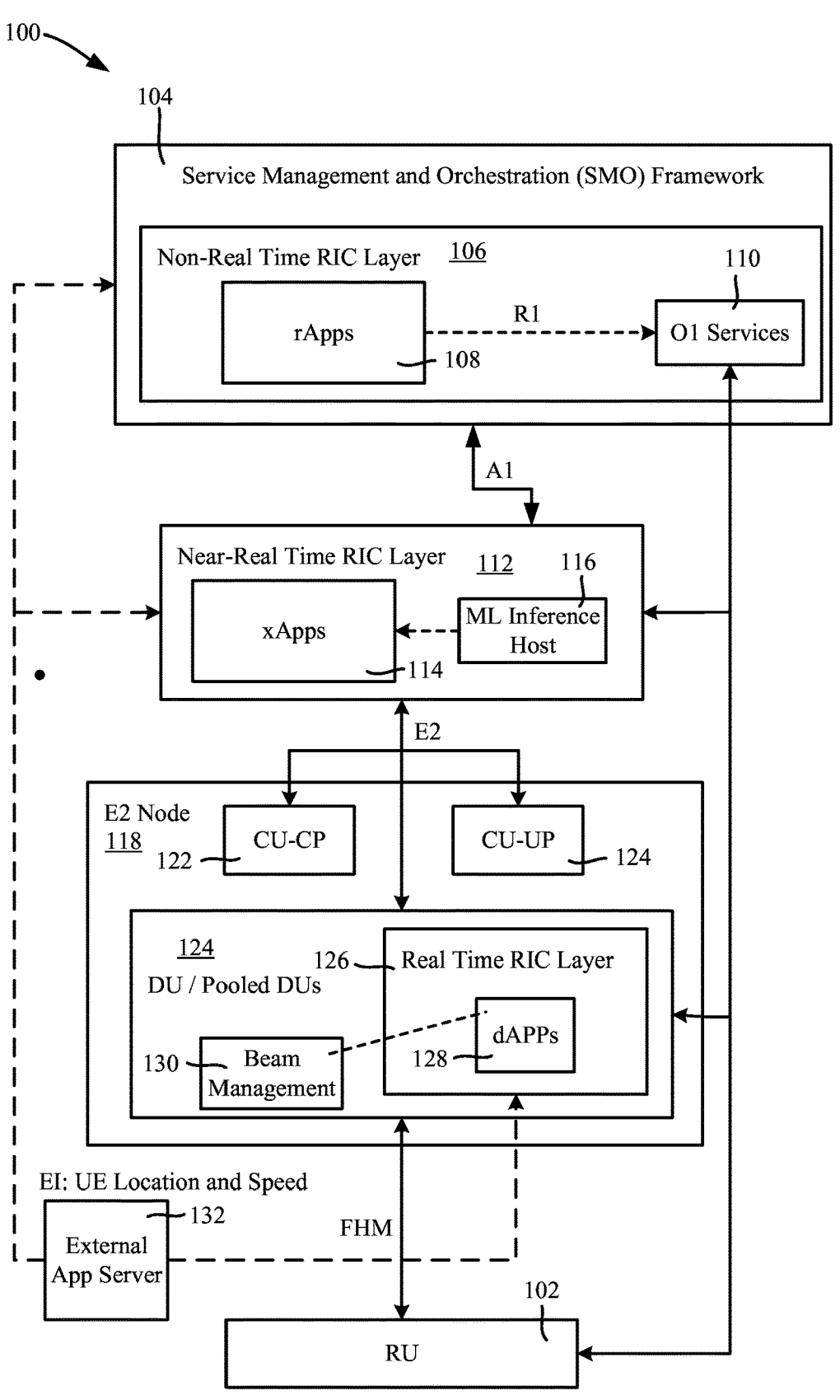
FIG. 1 is an example block diagram representation of a system/architecture into which interaction-aware multiple-user joint spatial-temporal beam management can be incorporated, in accordance with various aspects and implementations of the subject disclosure.

Various aspects of the technology described herein are generally directed towards joint spatial and temporal beam management, in which the spatial-temporal beam management operations increase accuracy on the prediction interval and skip the temporal beam management observation phase. As will be understood, the technology described herein can predict the best beam or best set of K-beams without full/sparse beam sweeping during the prediction interval, which reduces signaling overhead. Beam prediction as described herein can be considered a sequence generation task, where the network is interested in predicting the best beam for user equipment based on the history of selected beams and their corresponding reported reference signal received power (RSRP) of swept beams.

Further, the technology described herein facilitates beam management that is aware of interactions between multiple user equipment (UE). Such interaction-aware multiple UE beam prediction is highly correlated with UE mobility patterns and their corresponding trajectories. For example, users in vehicles and pedestrians typically follow paths defined by roads and walkways, respectively; such users do not move randomly and typically follow social customs, e.g., in crowded scenes they adapt their motion based on the movement of other users in their vicinity. To capture such deviations in trajectory, the technology described herein facilitates observation of social interactions, rather than observing the users in isolation.

Observing multiple users is used to build a model that can account for the behavior of other users within a neighborhood, while predicting a best beam per user. One such model described herein learns beam space, the environment and multi-user mobility pattern data and predicts the best beam per UE.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can mean the highest performing entity of what is available (e.g., the top-rated beam of some limited set of available beams), rather than necessarily achieving a fully optimal result. Similarly, "maximize" means moving towards a maximal state (e.g., up to some threshold limit, if any), rather than necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100 including various O-RAN (open-radio access network layers coupled to a radio unit (RU) 102. In the example system/ architecture 100, a service management and orchestration framework 104 includes a non-real time RIC layer 106 configured to run cloud-based applications 108 (referred to as rApps in O-RAN). The rApps 108 are coupled to O1 services 110 via an R1 interface; in turn the O1 services 110 are coupled via the O1 interface to the other layers to communicate various data.

A near-real time RIC layer 112 is coupled via the A1 interface to the non-real time RIC layer 106. The near-real time RIC layer 112 is configured to run edge-based appli- cations, (e.g., xApps 114 (extended apps) in O-RAN. One or more of the xApps 114 can be coupled to or incorporate an ML inference host 116.

As shown in FIG. 1, in general an E2 node 118, coupled to the near real time RIC layer via the E2 interface, includes a centralized unit (control plane) CU-CP 120 and centralized unit (user plane) CU-UP 122 components. The E2 node also includes a distributed unit or a pool of distributed units 124, which can include a real time RIC layer 126. The real time RIC layer 126 runs dApps 128; one or more of the dApps 128 can be coupled to or otherwise incorporate beam management (procedures) 130, including joint spatial-tem- poral beam management as described herein, possibly based on some information obtained from the other layers 106 and 112.

Also shown in FIG. 1 is an external application server 132. The external application server 132 can participate in various data collection operations.

With respect to beam sweeping and beam management in general, three phases, or procedures P1, P2 and P3 can be used. In P1, the base station performs a wide beam sweep covering its entire cell by transmitting a set of reference signals in which each reference signal corresponds to a specific beam. For an initial coarse estimate of the best beam direction, a limited number of wide beams can be used for a wide angular beam sweep. The reference signal can be, for example, the transmitted synchronization signal blocks (SSBs) during initial access, or periodic channel state infor- mation reference signals (CSI-RSs) configured for beam management. The UE measures the power of the received reference signals from all transmitted beams using a wide receive beam, and reports to the base station the beam with the highest received power.

In P2, the base station performs a beam refinement procedure by transmission of an aperiodic CSI-RS, using narrower beams in an angular direction around the best beam reported by the UE in P1. The UE measures the received power of CSI-RS in each transmit beam, using a wide receive beam, and reports to the base station the narrower beam with the highest received power. In P3, the base station transmits CSI-RS in the best narrow beam reported by the UE in P2 repeatedly, and the UE finds its best receive beam by measuring the power of the received CSI-RS in each received beam. For data transmission, the base station uses the best transmit beam found during P2, and the UE uses the best receive beam found during P3. Note that what is considered "best" or optimal can be considered the beam that achieves at least a threshold high performance, e.g., the highest performance relative to other candidate beams from the top-K subgroup; similarly, the top-K sub- group can be considered the beam set that achieves at least some threshold high performance.

Turning to joint spatial and temporal beam management, described herein is capturing spatial and temporal correla- tion data together; (this is in contrast to spatial and temporal beam management cases that capture spatial and temporal data separately). More particularly, aspects of the technol- ogy described herein are directed to a joint spatial/temporal beam management case that takes advantages of both spatial domain and temporal domain beam management. As will be understood, the joint spatial/temporal domain beam man- agement case includes spatial domain beam management on an observation window, which results in additional Top-K RSRP measurements as input data. Furthermore, the Top-K RSRP measurements of previous time instances of the prediction window can also be considered as input for both model training and inference phases. The joint case can result in removing the observation period and getting refined feedback measurement data from a prediction period.

Figure 2:
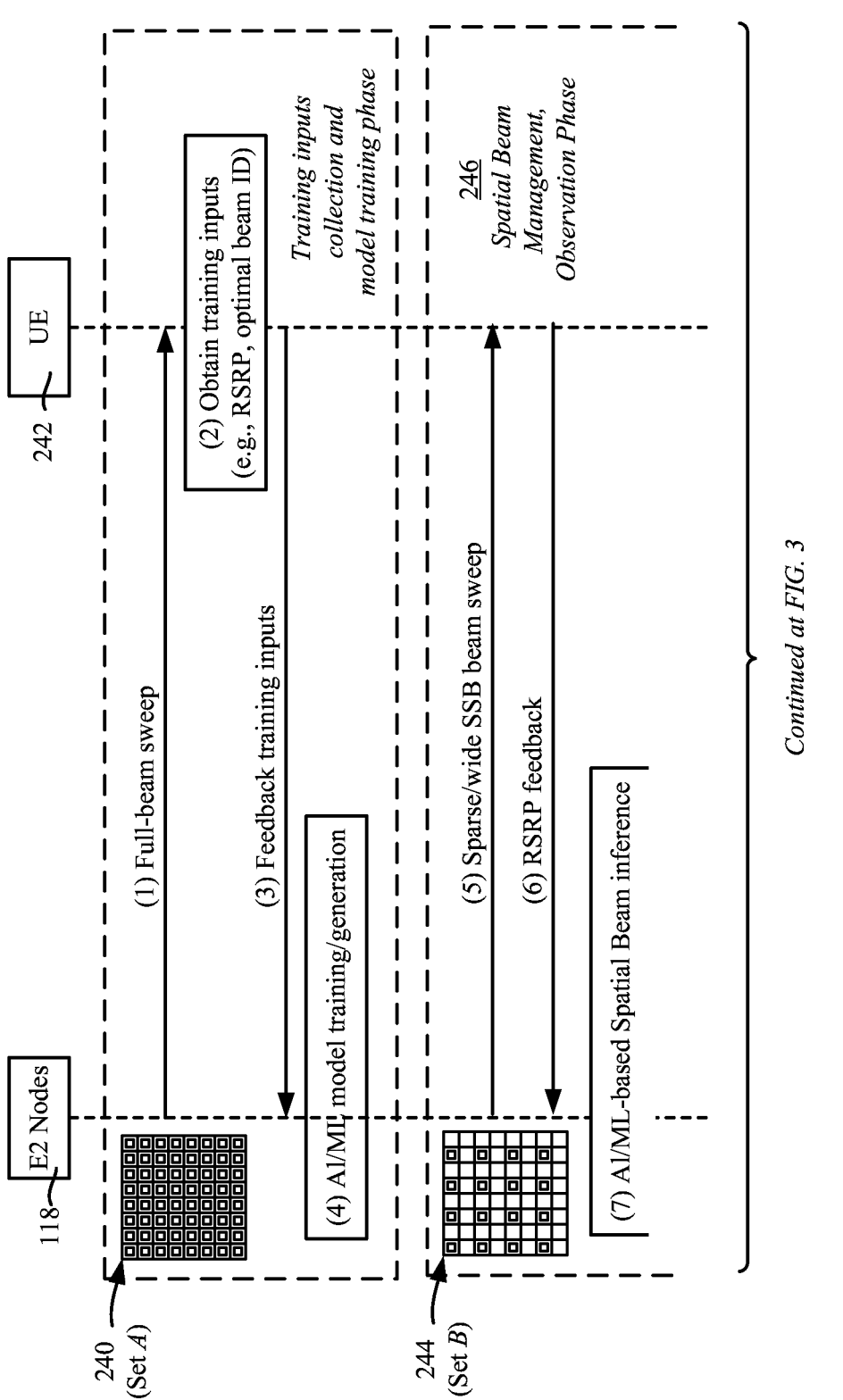
FIGS. 2 and 3 comprise an example sequence and data-flow diagram for joint spatial domain and temporal domain beam management, in accordance with various aspects and implementations of the subject disclosure.
Figure 3:
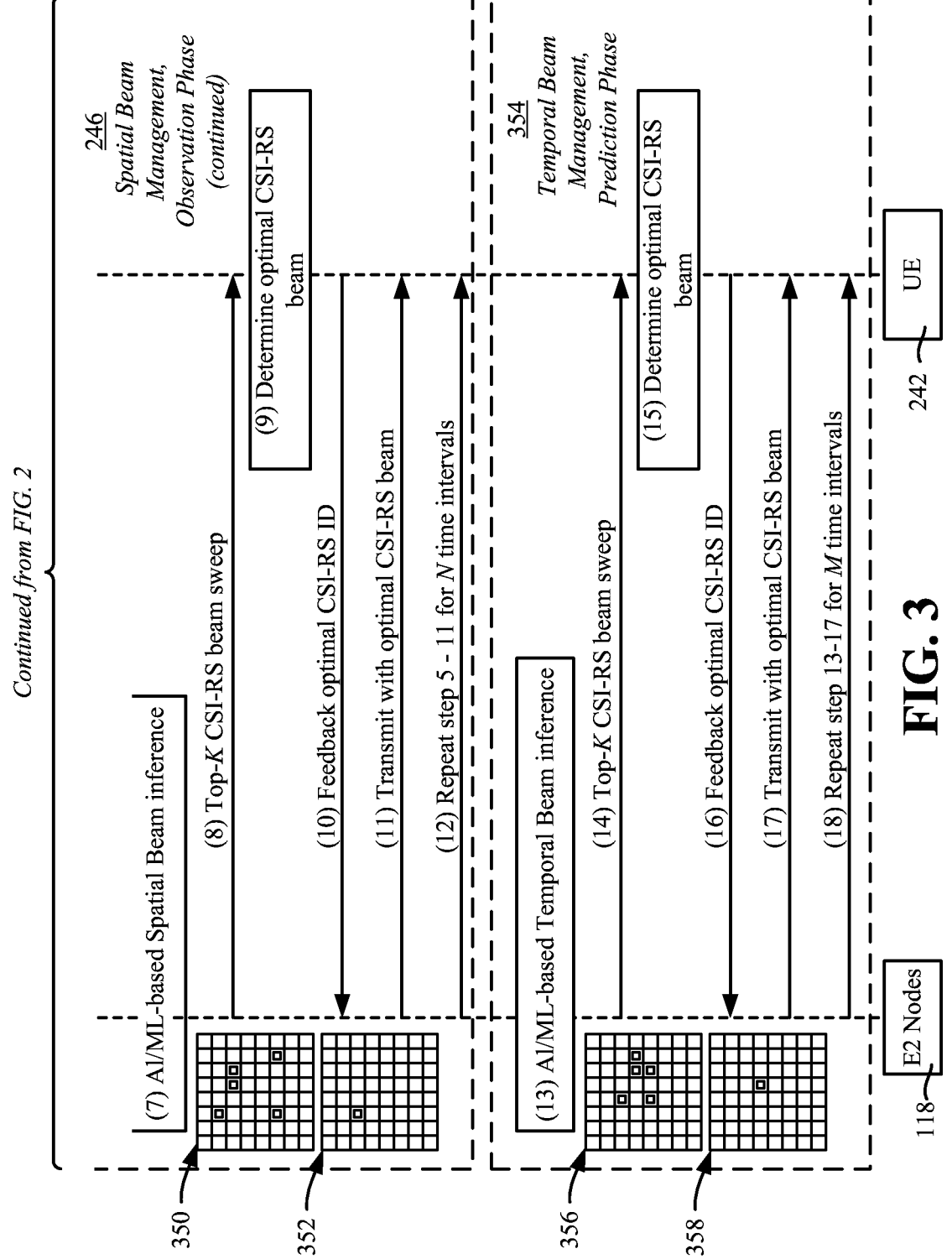

FIGS. 2 and 3 comprise an example joint spatial domain temporal domain beam management dataflow/sequence dia- gram of a network-side AI/ML beam management proce- dure. That is, model training and inference are performed at the base station in this example.

In one training phase, the network (e.g., the E2 node or nodes 118) sweeps all potential beams (set A) 240 to enable the UE 242 to determine and report the optimal beam ID, as represented by arrows one (1) through three (3). The refer- ence signal received power data (RSRPs) of a small set of sparse beams (set B) along with the corresponding optimal beam ID obtained from the full set of swept beams are fed back by the UE 242 ((arrow three (3)) to facilitate the collection and use of training input data, as represented by block four (4).

These training input data (the RSRPs of a small set of beams and their corresponding optimal beam IDs), which can be from multiple UEs within the coverage area, are thus collected by the network. For model training phase, the output is (or can be used to determine) a sparse set B 244, a subset of the full set of beams that is determined via the model to be sufficient to sweep the coverage area during inference given the current conditions.

Thus, the network (E2 node 118) only needs to sweep beams from the small set of sparse beams (set B 244) during further inference. This is represented by arrows five (5) and six (6) in FIG. 2. The process continues at FIG. 3, block seven (7), AL/ML-based spatial beam inference.

As can be seen in FIGS. 2 and 3, during the observation period/phase (block 246) spatial beam management is per- formed. The top-K CSI-RS beam sweeps (block 350) is used to determine the optimal CSI-RS beam (block 352) for N time intervals through the example steps indicated, as rep- resented by arrows five (5) and six (6), block seven, and arrows eight (8) through eleven (11), which are repeated as represented by arrow twelve (12). Note that although the blocks 350 and 352 are example static representations for purposes of illustration of a beam subset and optimal beam, respectively, the top-K CSI-RS beams and/or the optimal CSI-RS beam during this observation phase 246 can change over the N time intervals, e.g., particularly for a moving UE/dynamic environment.

As can be seen in the lower portion of FIG. 3, during the prediction period/phase (block 354) temporal beam man- agement is performed. The top-K CSI-RS beam sweeps (block 356) is used to determine the optimal CSI-RS beam (block 358) for M time intervals through the example steps indicated, as represented by block thirteen (13) and arrows fourteen (14) through seventeen (17), which are repeated as represented by arrow eighteen (18). Again, note that although the blocks 356 and 358 are example static representations for purposes of illustration, the top-K CSI-RS beams and/or the optimal CSI-RS beam during this prediction phase 354 can change over the M time intervals, e.g., particularly for a moving UE/dynamic environment.

As can be understood, because of the possibility of what is considered the optimal beam can change over time, this information can be used to determine a UE's trajectory data. That is, the time intervals are known, and the changing from one beam to another and so on can be used as input to a model that determines UE trajectory, as well as beam prediction.

Periodic measurement reporting-based beam management imposes significant overhead on networks, which is not scalable with increased number of users and beams. Described herein is incorporating AI/ML into beam management to predict the next best serving beam for a UE, and switch beams based on the measurement and indication history. In one implementation, long short-term memory (LSTM) networks are able to predict the best serving beam by learning a user mobility pattern. However, as set forth herein, users typically do not move randomly and rather follow social customs. To capture such rules in trajectory, instead of observing a group of users in isolation, a social-LSTM network can be used to model multiple user interactions in the beam management procedure.

Considering multiple UE scenarios results in modeling the environment, capturing cross-UE spatial and temporal correlations. The cross-UE spatial and temporal correlations help define the serving beam or best K beams more accurately. In other words, the multiple-UE beam management strategy described herein helps in forecasting each UE's future movement considering the surrounding environment (e.g., to avoid users running into each other).

Forecasting a UE's trajectory ahead of time results in significant reduction of measurement procedure overhead on the prediction interval/dwelling time, and accuracy improvement using predicted assistive information of a UE's location and speed. Capturing such cross-UE correlation into a beam management procedure factors into interference conditions and the dynamic shadowing effect, thereby increasing the accuracy. Aspects of the technology described herein can be based on the modeling of an environment, capturing multiple-UE cross correlations (both spatial and temporal), which leads to hidden or explicit trajectory prediction. Therefore, the type of users considered for such a model affect the results significantly.

In one model, single class users with the same mobility pattern are considered. In another model, multiple-class users with different mobility patterns are considered, e.g., a higher speed vehicle user class, a medium speed bicycle user class, a lower speed pedestrian user class, and so on. Considering multiple-classes of UEs leads to multi-modal trajectory prediction that can be hidden in the learned beam management model or visible in the model output.

Furthermore, the technology that models the cross-UE correlations (spatial/temporal) in the beam management procedure learns the environment changes and the channel variations accordingly. Learning the channel variations in the system increases the accuracy and reduces the cardinality of the measurement set data (i.e., reduces the overhead accordingly).

To model an environment capturing single UE trajectory, recurrent neural network (RNN) models (e.g., LSTM) can be used. Further, described herein is modeling an environment to predict multiple-UE trajectories, which needs more advanced RNN models that can capture cross-UE correlations in both single class UE and multiple class UE scenarios. The social-LSTM allows the sharing of state data between neighboring UEs. In the social-LSTM model, the hidden state information from (up to) all neighboring states can be pooled to capture the cross-correlation. The hidden state includes each UE's location and speed and the UE's history of measurement data. The social-LSTM architecture is used to learn the features of the beam space, environment, and correlated multiple-user mobility pattern.

Furthermore, the set of neighboring UEs can be defined based on a metric, which can, for example, be distance. This metric can be adapted as a function of UE profile data (e.g., speed, measured signal-to-noise-plus-interference ratio (SINR)) and other environment features.

As described with reference to FIG. 1, beam management 130, which can include ML model(s), can be incorporated or coupled to a dApp instance of the dApps 128, (where deployed applications on a real time RAN intelligent controller (RT-RIC) 126, are referred to as dApps, which enable real-time control in the RAN nodes). The RT-RIC 126 is collocated with the distributed unit (DU) 124 (which can be pooled), and is responsible for real time RAN control actions.

Figure 4:
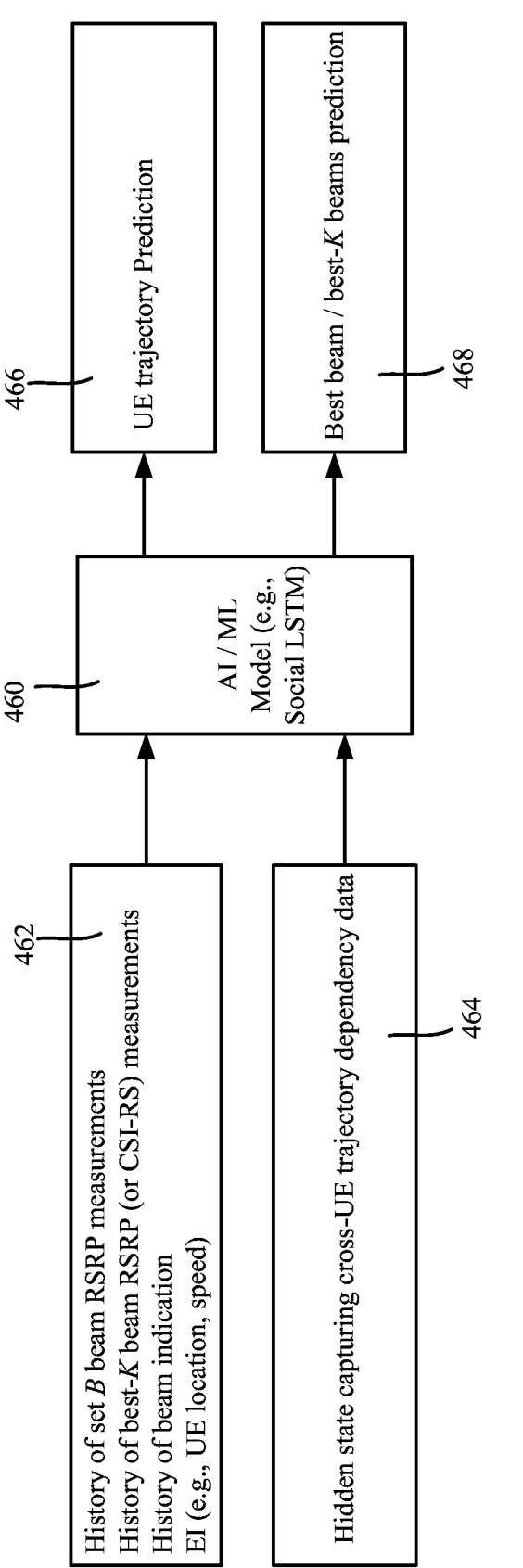
FIG. 4 shows an example machine learning model structure (e.g., social long short-term memory (LSTM)) for beam management/beam data prediction with respect to a user equipment, in accordance with various aspects and implementations of the subject disclosure.

An example ML model structure 460 of a beam management dApp is shown in FIG. 4. Input data 462 includes, but is not limited to, history of set B beam RSRP measurement data, history of best-K beam RSRP (or CSI-RS) measurement data, history of beam indication data (the selected optimal beams) and enrichment information, e.g., the UE location and speed (and possibly orientation) data. Another input dataset 464 includes the hidden state data, capturing cross-UE trajectory dependency data. The model output includes UE trajectory prediction data 466 and the best beam/best K-beam prediction data 468.

With respect to interaction-aware single class multiple-user beam management, as set forth herein beam prediction can be viewed as a sequence generation task, for predicting the best beam based on the history of selected beams. The best beam prediction is highly correlated with the UE mobility pattern and its corresponding trajectory. As is understood, users in crowded environments adapt their motion based on the movement of other users in their vicinity. Thus, the use of one LSTM model per user does not capture the interaction of users in a neighborhood.

Observing multiple users thus results in a model that can account for the behavior of other users within a large neighborhood (e.g., a cell or distance-based part thereof), while predicting a best beam per user. An adapted pooling-based LSTM model (social-LSTM) is thus used to jointly predict the best serving beams of all users in a neighborhood (e.g., cell) as described herein.

Figure 5:
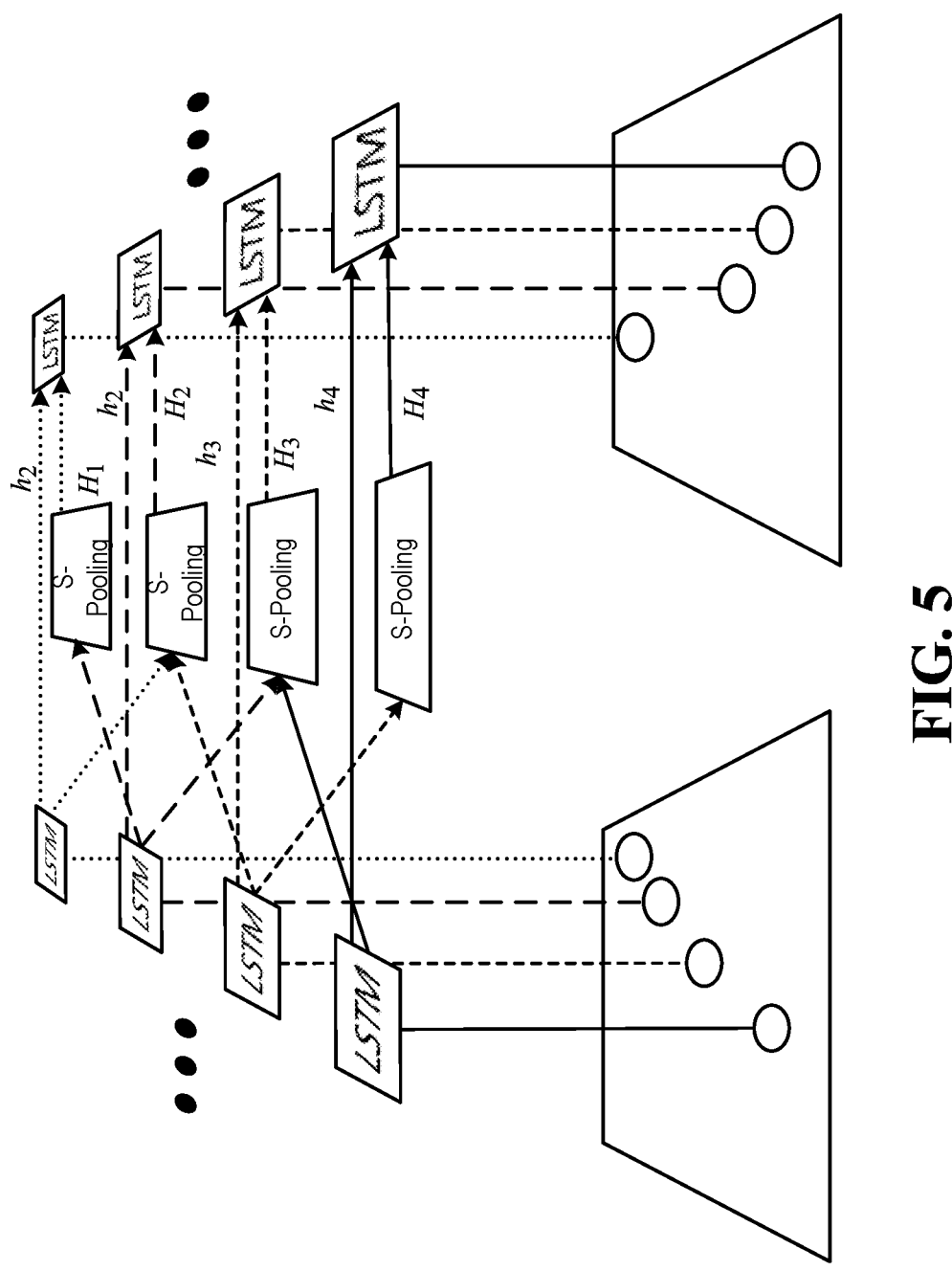
FIG. 5 is an example representation of social LSTM for beam management/beam data prediction with respect to a user equipment, in accordance with various aspects and implementations of the subject disclosure.

Social-LSTM connects neighboring LSTMs to capture the interaction of users. In the social-LSTM method, a separate LSTM network for each user in the cell is used and a social pooling (S-pooling) layer connects the LSTMs to each other. The pooling operation is depicted in FIG. 5. Spatially proximal LSTMs share information with each other through this pooling layer. The hidden-states of the LSTMs in a neighborhood are pooled together and used as an input at the next time-step.

In the beam management procedure, features of the hidden states and a utility metric are defined to capture the states of neighboring users. The hidden state $$h_i^t$$

of the LSTM at time t captures the latent representation of $i^{th}$ user in the cell. As described in FIG. 4, this representation includes the set B RSRP measurements, the best-K beam RSRP measurements, and the UE trajectory information upon availability. This representation is shared with neighboring users using a social hidden state tensor $$H_t^i$$

defined as $$H_t^i(s,:) = \sum_{j \in N_i} 1_s[x_{t-1}^i, x_{t-1}^j]h_{t-1}^j,$$

where $$h_{t-1}^j$$

is the hidden state of the LSTM corresponding to the $j^{th}$ user at $$t-1, 1_{s_i}[x_t^i, x_t^j]$$

is an indicator function to check if user j is in the defined neighborhood of user i, and $N_i$ is the set of neighbors corresponding to user i. Note that $s_i$ is a user-dependent metric (function of UE profile) that defines the vicinity radius. Upon availability of UE location information, $$x_{t-1}^i$$

is the position of the $i^{th}$ user at t−1, otherwise, it is the index of served beam at t−1.

Using the pooled social hidden-state tensor $$H_t^i$$

leads to the following recurrence:

$$h_i^t = LSTM(h_i^{t-1}, H_t^i; W),$$

where W is the LSTM weight and $$h_i^t$$

is the predicted RSRP measurements of the set B and the best-K beams at time t for the $i^{th}$ user. Furthermore, upon availability of UE location information, the output also includes UE trajectory prediction.

Multiple-class user beam management takes into consideration the classification of agents, such as cars, pedestrians, or bikes, and predicts their varying behaviors. The interactions between different agent classes can also play a significant role in real-world traffic scenarios, and consequently in beam management. For the multiple-class multi-user beam management scenario, an interaction-conscious model captures inter/intra class interactions and dependencies.

For this scenario, a social-LSTM method with modified hidden state features is used, in comparison to the above-described single class multi-user beam management case. The hidden state $$h_i^t$$

of the LSTM at time t captures the latent representation of $i^{th}$ user in the cell and the class of user i at time t. This representation includes set B RSRP measurements, best-K beam RSRP measurements, user class, and UE trajectory information upon availability.

The user class may not be available to the beam prediction model. In this case, the class is identified by the trajectory information history. If the user location and speed are provided through an external server (e.g., the server 132 FIG. 1), the UE classification can be performed using the UE speed. If there is no information on the UE speed to classify it into different classes, a feed forward neural network can be used to classify a user based on its historical state as set forth below:

$$c_i^t = a\left(\bigcup_{j=t-T_{ob}}^{t} h_i^j\right)$$

where the function a is a feed forward neural network which is trained jointly with the whole network and $$c_i^t$$

is class of user i at time t. It is worth noting that the class of specific user i can change based on its speed. In other words, the class of each user is not fixed.

As can be seen, a social-LSTM method can share the states between neighboring UEs. In the social-LSTM method, the hidden state information from up to all neighboring UEs can be pooled to model mobility pattern dependency of the users. The hidden state includes the measured RSRP of sparse swept beams on the observation period, history of optimal CSI-RS beam ID and inferred UE trajectory information (i.e., location and speed). To share the hidden state of neighboring UEs with each user, a UE dependent neighboring metric Ni can be defined to specify the set of UEs of which their states are to be shared with the user i. This metric can be a function of UE profile (e.g., speed). Interaction-aware multi-user beam prediction could be used for temporal and joint spatial-temporal beam management cases.

One or more aspects can be embodied in network equipment, such as represented in the example operations of FIG. 6, and for example can include a memory that stores computer executable components and/or operations, and a processor that executes computer executable components and/or operations stored in the memory. Example operations can include operation 602, which represents conducting a spatial beam management observation phase over a first number of first time intervals of a spatial observation period, which can include example operations 604 and 606. Example operation 604 represents performing synchronization signal block beam sweeping to determine a high performing subgroup of beams with respect to received power data, corresponding to the synchronization signal block beam sweeping, returned from a user equipment. Example operation 606 represents determining a spatial beam pair that is usable to achieve at least a first threshold high performance, comprising performing first channel state information-reference signal beam sweeping using the high performing subgroup of beams to obtain from the user equipment a first channel state information-reference signal identifier representing the spatial beam pair. Example operation 608 represents conducting a temporal beam management prediction phase over a second number of second time intervals of a temporal prediction period, which can include example operations 610 and 612. Example operation 610 represents determining a temporal beam pair that is usable to achieve at least a second threshold high performance, comprising performing second channel state information-reference signal beam sweeping based on the spatial beam pair to obtain from the user equipment a second channel state information-reference signal identifier representing the temporal beam pair. Example operation 612 represents estimating trajectory data of the user equipment based on the spatial beam pair and the temporal beam pair.

Performing the synchronization signal block beam sweeping comprises obtaining a sparse group of beams from a model, and using the sparse group of beams.

Performing the second channel state information-reference signal beam sweeping based on the spatial beam pair comprises using at least some of the high performing subgroup of beams that comprises the spatial beam pair.

The trajectory data of the user equipment can include first trajectory data of a first user equipment, and further operations can include estimating second trajectory data of a second user equipment, and predicting future optimal beam data for the first user equipment based on the first trajectory data and the second trajectory data.

Estimating of the trajectory data and the predicting the future optimal beam for the first user equipment can include inputting, to a model, a first dataset comprising historical beam measurement data, historical beam indication data, location data of the first user equipment and speed data of the first user equipment, inputting, to the model, a second dataset comprising cross-user equipment trajectory dependency data based on the first trajectory data and the second trajectory data, and, in response to the inputting of the a first dataset and the second dataset to the model, obtaining an estimate of the trajectory data and a prediction of the future optimal beam data.

Future optimal beam data for the first user equipment can include first future optimal beam data, and further operations can include predicting second future optimal beam data for the second user equipment based on the trajectory data and the second trajectory data.

The network equipment comprises a distributed component corresponding to a communications neighborhood, the model can be a first model of the distributed component, determining the spatial beam pair can be performed using a second model of the distributed component that can include a spatial inference model, and determining the temporal beam pair can be performed using a third model of the distributed component comprising a temporal inference model.

The historical beam measurement data can include first historical reference signal received power measurement data corresponding to the synchronization signal block beam sweeping and second historical reference signal received power measurement data corresponding to at least one of: the first channel state information-reference signal beam sweeping, or the second channel state information-reference signal beam sweeping.

The trajectory data of the user equipment can include first trajectory data of a first user equipment, and further operations can include estimating respective other trajectory data of respective other user equipment of a group that can include the first user equipment and the respective other user equipment, predicting future optimal beam data for the first user equipment based on the first trajectory data and the other trajectory data, and predicting respective other future optimal beam data for the respective other user equipment based on the first trajectory data and the respective other trajectory data.

The group that can include the first user equipment and the respective other user equipment can be classified into a class of user equipment.

Further operations can include classifying the group into the class based on the first trajectory data and the respective other trajectory data.

Further operations can include classifying the group into the class based on first historical state data of the first user equipment and respective other historical state data of the respective other user equipment.

The trajectory data of the user equipment can include first trajectory data of a first user equipment, the first user equipment and respective first other user equipment can be classified into a first classification group, and further operations can include estimating respective first other trajectory data of the respective first other user equipment, estimating respective second other trajectory data of respective second user equipment of a second classification group that comprises the respective second user equipment, predicting a future optimal beam for the first user equipment based on the first trajectory data, the first other trajectory data, and the second other trajectory data, and predicting respective other first future optimal beams for the respective first other user equipment based on the first trajectory data, the first other trajectory data, and the second other trajectory data.

Further operations can include predicting respective other second future optimal beams for the respective second other user equipment based on the first trajectory data, the first other trajectory data, and the second other trajectory data.

One or more example aspects, such as corresponding to example operations of a method, are represented in FIG. 7. Example operation 702 represents determining, by a system comprising a processor, for a group of respective user equipment in a communications neighborhood, respective trajectory data based on respective joint spatial and temporal beam data obtained for the respective user equipment. Example operation 704 represents inputting, by the system to a social recurrent neural network model, first trajectory data of a first user equipment of the group, and trajectory cross-dependency data based on the respective trajectory data. Example operation 706 represents, in response to the inputting, obtaining by the system for the first user equipment, predicted trajectory data and predicted future optimal beam data.

The first trajectory data can be part of a dataset, the dataset further can include historical beam measurement data and historical beam indication data, and inputting the first trajectory data can include inputting the dataset to the social recurrent neural network model.

Further operations can include determining, by the system, the respective joint spatial and temporal beam data, which can include conducting respective spatial beam management observation phases to obtain respective spatial beam data, and conducting respective temporal beam management prediction phases based on the respective spatial beam data.

FIG. 8 summarizes various example operations, e.g., corresponding to a machine-readable medium, comprising executable instructions that, when executed by a processor, facilitate performance of operations. Example operation 802 represents determining respective joint spatial and temporal beam data, comprising conducting respective spatial beam management observation phases to obtain respective spatial beam data, and conducting respective temporal beam management prediction phases based on the respective spatial beam data. Example operation 804 represents determining, for respective user equipment, respective trajectory data based on the respective joint spatial and temporal beam data. Example operation 806 represents obtaining cross-dependency trajectory data based on the respective trajectory data. Example operation 808 represents inputting the cross-dependency trajectory data and first trajectory data of a first user equipment of the respective user equipment to a model. Example operation 810 represents, in response to the inputting, obtaining first predicted trajectory data for the first user equipment, and first predicted future optimal beam data for the first user equipment.

Further operations can include inputting the cross-dependency trajectory data and second trajectory data of a second user equipment of the respective user equipment to the model, and, in response to the inputting, obtaining second predicted trajectory data for the second user equipment, and second predicted future optimal beam data for the first user equipment.

Conducting the respective spatial beam management observation phases can include performing respective synchronization signal block beam sweeping to determine respective high performing subgroups of beams based on respective received power data corresponding to the synchronization signal block beam sweeping, and determining the respective optimal spatial beam data, comprising performing respective first channel state information-reference signal beam sweeping using the respective high performing subgroups of beams to obtain from respective user equipment respective first channel state information-reference signal identifiers representing the respective optimal spatial beam data; conducting the respective temporal beam management prediction phases can include determining the respective optimal temporal beam data, which can include performing respective second channel state information-reference signal beam sweeping based on the respective spatial beam data to obtain from the respective user equipment respective second channel state information-reference signal identifiers representing the respective temporal beam data.

As can be seen, the technology described herein facilitates improved reliability and throughput, along with decreased latency and signaling overhead, in a communications network. In joint spatial/temporal beam management the observation-only phase of temporal beam is skipped with spatial beam management performed on the observation period. Performing spatial beam management on the observation period provides an optimal CSI-RS ID, which improves the accuracy of best K-beam selection on the prediction interval. Furthermore, performing spatial beam management on the observation period increases spectral efficiency on the observation period.

Further, observing multiple users facilitates a model that can account for the behavior of other users within a neighborhood, while predicting a best beam per user, and/or future trajectory data. Social-LSTM connects neighboring LSTMs to capture the interaction of users. A single user class or multiple classes of users can be considered for the prediction data.

Figure 9:
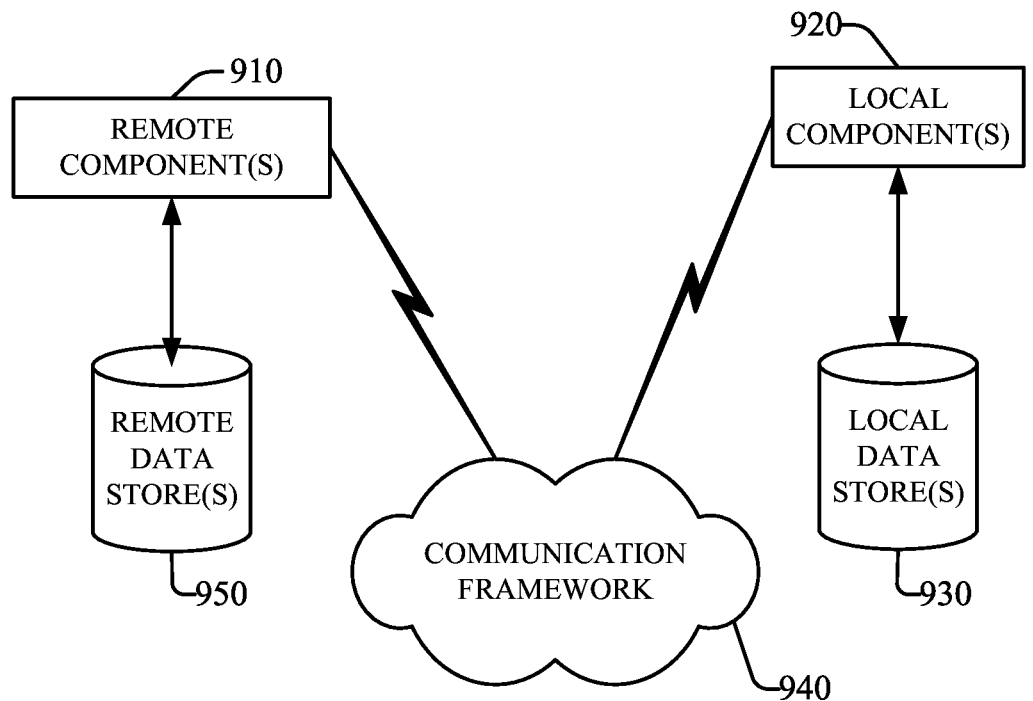
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
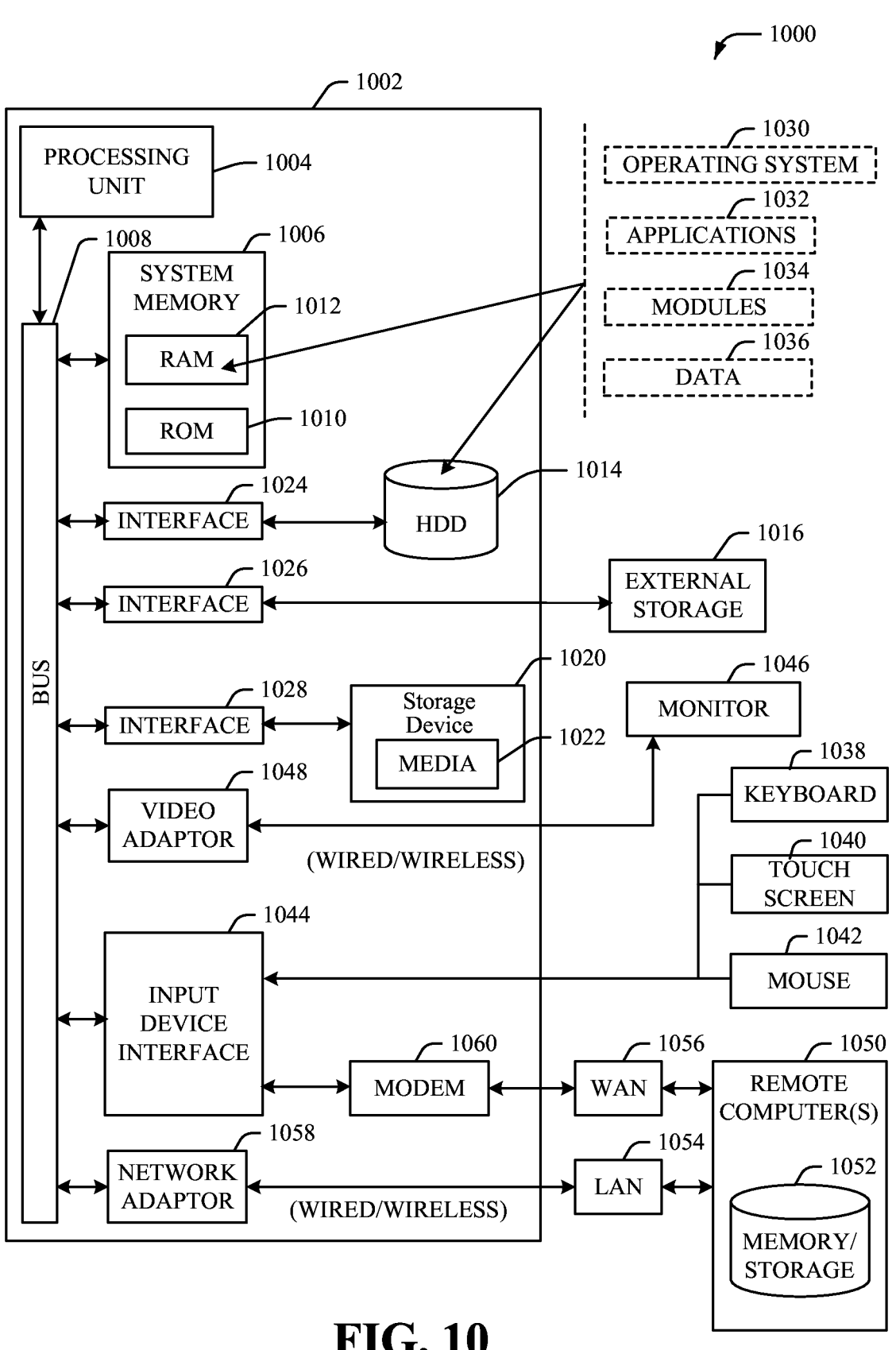
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
at least one processor; and
at least one memory that stores executable instructions that, when executed by the at least one processor, facilitate performance of operations, the operations comprising:
conducting a spatial beam management observation phase over a first number of first time intervals of a spatial observation period, comprising:
performing synchronization signal block beam sweeping to determine, from a group of beams, a high performing subgroup of beams with respect to received power data, corresponding to the synchronization signal block beam sweeping, returned from a user equipment, wherein the high performing subgroup of beams is higher performing than other beams of the group of beams,
determining a spatial beam pair that satisfies at least a first threshold high performance, comprising performing first channel state information-reference signal beam sweeping using the high performing subgroup of beams to obtain, from the user equipment, a first channel state information-reference signal identifier representing the spatial beam pair;
conducting a temporal beam management prediction phase over a second number of second time intervals of a temporal prediction period, comprising:
determining a temporal beam pair that satisfies at least a second threshold high performance, comprising performing second channel state information-reference signal beam sweeping based on the spatial beam pair to obtain, from the user equipment, a second channel state information-reference signal identifier representing the temporal beam pair; and
estimating trajectory data of the user equipment based on the spatial beam pair and the temporal beam pair.
2. The network equipment of claim 1, wherein the group of beams is a sparse group of beams, and wherein the performing of the synchronization signal block beam sweeping comprises obtaining the sparse group of beams from a model, and using the sparse group of beams during the performing of the synchronization signal block beam sweeping.

3. The network equipment of claim 1, wherein the performing of the second channel state information-reference signal beam sweeping based on the spatial beam pair comprises using at least some of the high performing subgroup of beams that comprises the spatial beam pair.

4. The network equipment of claim 1, wherein the trajectory data of the user equipment comprises first trajectory data of a first user equipment, wherein the operations further comprise estimating second trajectory data of a second user equipment, and predicting future optimal beam data for the first user equipment based on the first trajectory data and the second trajectory data, and wherein the future optimal beam data is determined to be optimal based on satisfying a defined performance criterion.

5. The network equipment of claim 4, wherein the estimating of the trajectory data and the predicting of the future optimal beam data for the first user equipment comprises inputting, to a model, a first dataset comprising historical beam measurement data, historical beam indication data, location data of the first user equipment, and speed data of the first user equipment, inputting, to the model, a second dataset comprising cross-user equipment trajectory dependency data based on the first trajectory data and the second trajectory data, and, in response to the inputting of the first dataset and the second dataset to the model, obtaining, from the model, an estimate of the first trajectory data and a prediction of the future optimal beam data.

6. The network equipment of claim 5, wherein the future optimal beam data for the first user equipment comprises first future optimal beam data, and wherein the operations further comprise predicting second future optimal beam data for the second user equipment based on the first trajectory data and the second trajectory data.

7. The network equipment of claim 5, wherein the network equipment comprises a distributed equipment corresponding to a communications neighborhood, wherein the model is a first model of the distributed equipment, wherein the determining of the spatial beam pair is performed using a second model of the distributed equipment comprising a spatial inference model, and wherein the determining of the temporal beam pair is performed using a third model of the distributed equipment comprising a temporal inference model.

8. The network equipment of claim 5, wherein the historical beam measurement data comprises first historical reference signal received power measurement data corresponding to the synchronization signal block beam sweeping and second historical reference signal received power measurement data corresponding to at least one of: the first channel state information-reference signal beam sweeping, or the second channel state information-reference signal beam sweeping.

9. The network equipment of claim 1, wherein the trajectory data of the user equipment comprises first trajectory data of a first user equipment, wherein the operations further comprise estimating respective other trajectory data of respective other user equipment of a group of user equipment that comprises the first user equipment and the respective other user equipment, predicting future optimal beam data for the first user equipment based on the first trajectory data and the other trajectory data, and predicting respective other future optimal beam data for the respective other user equipment based on the first trajectory data and the respective other trajectory data, and wherein the future optimal beam data is determined to be optimal based on satisfying a defined performance criterion.

10. The network equipment of claim 9, wherein the group of user equipment that comprises the first user equipment and the respective other user equipment is classified into a class of user equipment.

11. The network equipment of claim 10, wherein the operations further comprise classifying the group of user equipment into the class based on the first trajectory data and the respective other trajectory data.

12. The network equipment of claim 10, wherein the operations further comprise classifying the group of user equipment into the class based on first historical state data of the first user equipment and respective other historical state data of the respective other user equipment.

13. The network equipment of claim 1, wherein the trajectory data of the user equipment comprises first trajectory data of a first user equipment, wherein the first user equipment and respective first other user equipment are classified into a first classification group, wherein the operations further comprise estimating respective first other trajectory data of the respective first other user equipment, estimating respective second other trajectory data of respective second user equipment of a second classification group that comprises the respective second user equipment, predicting a future optimal beam for the first user equipment based on the first trajectory data, the first other trajectory data, and the second other trajectory data, and predicting respective other first future optimal beams for the respective first other user equipment based on the first trajectory data, the first other trajectory data, and the second other trajectory data, and wherein the future optimal beam is determined to be optimal based on satisfying a defined performance criterion.

14. The network equipment of claim 13, wherein the operations further comprise predicting respective other second future optimal beams for the respective second other user equipment based on the first trajectory data, the first other trajectory data, and the second other trajectory data.

15. A method, comprising:

determining, by a system comprising at least one processor, for a group of respective user equipment in a communications neighborhood, respective trajectory data based on respective joint spatial and temporal beam data obtained for the respective user equipment of the group of respective user equipment comprising first user equipment and second user equipment;

based on the respective trajectory data, inputting, by the system to a social recurrent neural network model, first trajectory data of the first user equipment, second trajectory data of the second user equipment, and trajectory cross-dependency data; and in response to the inputting, obtaining, by the system from the social recurrent neural network model, first predicted trajectory data and first predicted future optimal beam data for the first user equipment, and second predicted trajectory data and second predicted future optimal beam data for the second user equipment, wherein the first predicted future optimal beam data and the second predicted future optimal beam data are determined to be optimal based on satisfying a defined performance criterion.

16. The method of claim 15, wherein the first trajectory data is part of a dataset, the dataset further comprising historical beam measurement data and historical beam indication data, and wherein the inputting of the first trajectory data comprises inputting the dataset to the social recurrent neural network model.

17. The method of claim 15, further comprising determining, by the system, the respective joint spatial and temporal beam data, comprising conducting respective spatial beam management observation phases to obtain respective spatial beam data, and conducting respective temporal beam management prediction phases based on the respective spatial beam data.

18. A non-transitory machine-readable medium, comprising executable instructions that, when executed by at least one processor, facilitate performance of operations, the operations comprising:

determining respective joint spatial and temporal beam data, comprising conducting respective spatial beam management observation phases to obtain respective spatial beam data, and conducting respective temporal beam management prediction phases based on the respective spatial beam data;

determining, for respective user equipment, respective trajectory data based on the respective joint spatial and temporal beam data, wherein the respective user equipment comprise first user equipment and second user equipment;

obtaining cross-dependency trajectory data based on the respective trajectory data;

inputting, to a model, the cross-dependency trajectory data, first trajectory data of the first user equipment, and second trajectory data of the second user equipment; and in response to the inputting, obtaining, from the model, first predicted trajectory data and first predicted future optimal beam data for the first user equipment, and second predicted trajectory data and second predicted future optimal beam data for the second user equipment, wherein the first predicted future optimal beam data and the second predicted future optimal beam data are determined to be optimal based on satisfying a defined performance criterion.

19. The non-transitory machine-readable medium of claim 18, wherein, based on the first trajectory data, the second trajectory data, or the cross-dependency trajectory data, the model infers the first predicted trajectory data, the second predicted trajectory data, the first predicted future optimal beam data, or the second predicted future optimal beam data.

20. The non-transitory machine-readable medium of claim 18, wherein the conducting of the respective spatial beam management observation phases comprises:

performing respective synchronization signal block beam sweeping to determine respective high performing subgroups of beams based on respective received power data corresponding to the synchronization signal block beam sweeping, and determining the respective optimal spatial beam data, comprising performing respective first channel state information-reference signal beam sweeping using the respective high performing subgroups of beams to obtain from the respective user equipment respective first channel state information-reference signal identifiers representing the respective optimal spatial beam data; and wherein the conducting of the respective temporal beam management prediction phases comprises:

determining the respective optimal temporal beam data, comprising performing respective second channel state information-reference signal beam sweeping based on the respective spatial beam data to obtain from the respective user equipment respective second channel state information-reference signal identifiers representing the respective temporal beam data.

* * * * *